(12) United States Patent
Hodique et al.

(10) Patent No.: US 10,498,664 B2
(45) Date of Patent: Dec. 3, 2019

(54) HYBRID CLOUD RESOURCE SCHEDULING

(71) Applicant: VMware, Inc., Palo Alto, CA (US)

(72) Inventors: Yann Hodique, San Jose, CA (US);
Anne Holler, Los Altos, CA (US); Jai Jaswani, Mountain View, CA (US);
Samit Sawant, San Jose, CA (US);
Mustafa Uysal, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 564 days.

(21) Appl. No.: 14/754,008

(22) Filed: Jun. 29, 2015

(65) Prior Publication Data

US 2016/0380906 A1    Dec. 29, 2016

(51) Int. Cl.
*G06F 15/173*    (2006.01)
*H04L 12/911*    (2013.01)

(52) U.S. Cl.
CPC .................. *H04L 47/70* (2013.01)

(58) Field of Classification Search
USPC ................................ 709/223, 226
See application file for complete search history.

(56) References Cited

U.S. PATENT DOCUMENTS

| | | | | |
|---|---|---|---|---|
| 2009/0055507 A1* | 2/2009 | Oeda | ...... | G06F 9/4856 709/216 |
| 2010/0111105 A1* | 5/2010 | Hamilton | ...... | H04L 67/322 370/469 |
| 2010/0153945 A1* | 6/2010 | Bansal | ...... | G06F 9/4881 718/1 |
| 2010/0262964 A1* | 10/2010 | Uyeda | ...... | G06F 9/5044 718/1 |
| 2012/0005051 A1* | 1/2012 | Deng | ...... | G06F 9/5072 705/34 |
| 2012/0239792 A1* | 9/2012 | Banerjee | ...... | H04L 67/1097 709/223 |
| 2013/0297770 A1* | 11/2013 | Zhang | ...... | G06F 9/505 709/224 |
| 2014/0089511 A1* | 3/2014 | McLean | ...... | G06F 9/5061 709/226 |
| 2014/0189092 A1* | 7/2014 | Zhang | ...... | H04L 41/5019 709/224 |
| 2015/0193466 A1* | 7/2015 | Luft | ...... | G06F 16/182 707/634 |
| 2015/0193862 A1* | 7/2015 | Luft | ...... | G06Q 30/0641 705/27.1 |
| 2015/0195347 A1* | 7/2015 | Luft | ...... | H04L 67/10 709/203 |
| 2015/0295792 A1* | 10/2015 | Cropper | ...... | H04L 41/5022 709/226 |

(Continued)

*Primary Examiner* — Hee Soo Kim
(74) *Attorney, Agent, or Firm* — Loza & Loza, LLP (57) ABSTRACT

In an example, a method of placing a virtual computing instance among a plurality of datacenters includes comparing constraints specified for the virtual computing instance against resource metrics obtained from the plurality of datacenters, and a budget specified for the virtual computing instance against admission prices for a plurality of tiers of the plurality of datacenters, to generate a candidate set of datacenters. The method further includes scoring the candidate set of datacenters. The method further includes deploying the virtual computing instance to a target datacenter selected from the candidate set of datacenters that satisfies a threshold score.

17 Claims, 4 Drawing Sheets

(56) References Cited

U.S. PATENT DOCUMENTS

| | | | |
|---|---|---|---|
| 2015/0326495 A1* | 11/2015 | Shimamura | G06F 9/5077 709/226 |
| 2015/0355892 A1* | 12/2015 | Glikson | G06F 9/4856 718/1 |
| 2016/0197834 A1* | 7/2016 | Luft | H04L 12/4641 709/223 |
| 2016/0198003 A1* | 7/2016 | Luft | H04L 12/46 709/225 |
| 2017/0262303 A1* | 9/2017 | Allen | G06F 9/45545 |

* cited by examiner

HYBRID CLOUD RESOURCE SCHEDULING

BACKGROUND

Private datacenters have typically been provisioned to accommodate projected peak resource demand, with that peak increasing every year. The hybrid cloud model, in which off-premise resources can be purchased to extend the enterprise datacenter, promises to reduce the continued growth in capital expenses needed to fully accommodate peak resource demand. One of the concerns with the hybrid cloud model is the scheduling of resources for workloads among enterprise datacenter resources and cloud resources. Enterprise datacenter resources typically have a sunk-cost, whereas cloud resources typically must be purchased as they are used. Pricing for cloud resources can be complex, depending on time of day, congestion, and the like. Furthermore, some workloads may be restricted from being deployed to public cloud resources, requiring the use of enterprise or private cloud resources. As such, it can be difficult for an administrator to manage deployment of workloads between enterprise datacenter resources and cloud resources in a hybrid cloud environment.

SUMMARY

One or more embodiments provide techniques for hybrid cloud resource scheduling. In an embodiment, method of placing a virtual computing instance among a plurality of datacenters includes comparing constraints specified for the virtual computing instance against resource metrics obtained from the plurality of datacenters, and a budget specified for the virtual computing instance against admission prices for a plurality of tiers of the plurality of datacenters, to generate a candidate set of datacenters. The method further includes scoring the candidate set of datacenters. The method further includes deploying the virtual computing instance to a target datacenter selected from the candidate set of datacenters that satisfies a threshold score.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Reference throughout this specification to "one embodiment," "an embodiment," or similar language means that a particular feature, structure, or characteristic described in connection with the indicated embodiment is included in at least one embodiment of the disclosure. Thus, the phrases "in one embodiment," "in an embodiment," and similar language throughout this specification may, but do not necessarily, all refer to the same embodiment.

Figure 1:
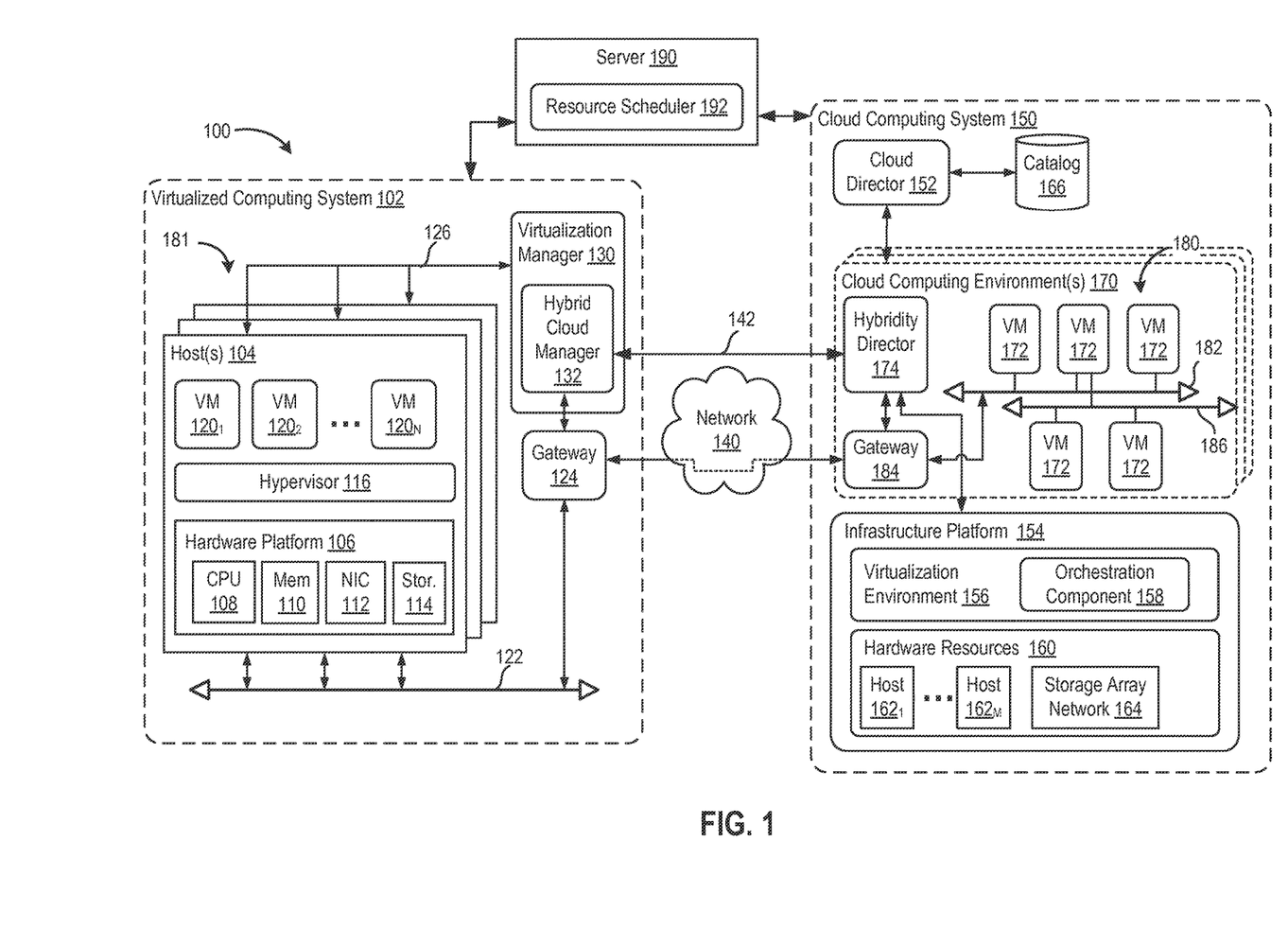
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, an instance of a virtualized computing system may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware® ESXi™ hypervisor provided as part of the VMware® vSphere® solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140. Virtualized computing system 102 can provide an enterprise datacenter 181.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Hybrid cloud computing system 100 further includes a server 190 executing a resource scheduler 192. Server 190 may be constructed on a server grade hardware platform, such as an x86 architecture platform, a desktop, and a laptop. Server 190 includes conventional components of a computing device, such as CPUs, system memory, network interface(s), a storage system, IO devices, and the like. Resource scheduler 192 can include software executable by the hardware platform of the server 190. Resource scheduler 192 is configured to handle placement of virtual workloads across datacenters. A virtual workload includes one or more VMs. Datacenters can include enterprise datacenter 181 or any virtual datacenter 180 established in cloud computing system 150 (e.g., a virtual private cloud datacenter and/or a public cloud datacenter). Resource scheduler 192 evaluates capacity of datacenters in terms of constraints, resource availability, and cost. As described herein, resource scheduler 192 places virtual workloads based on evaluated capacity in an optimal manner.

Figure 2:
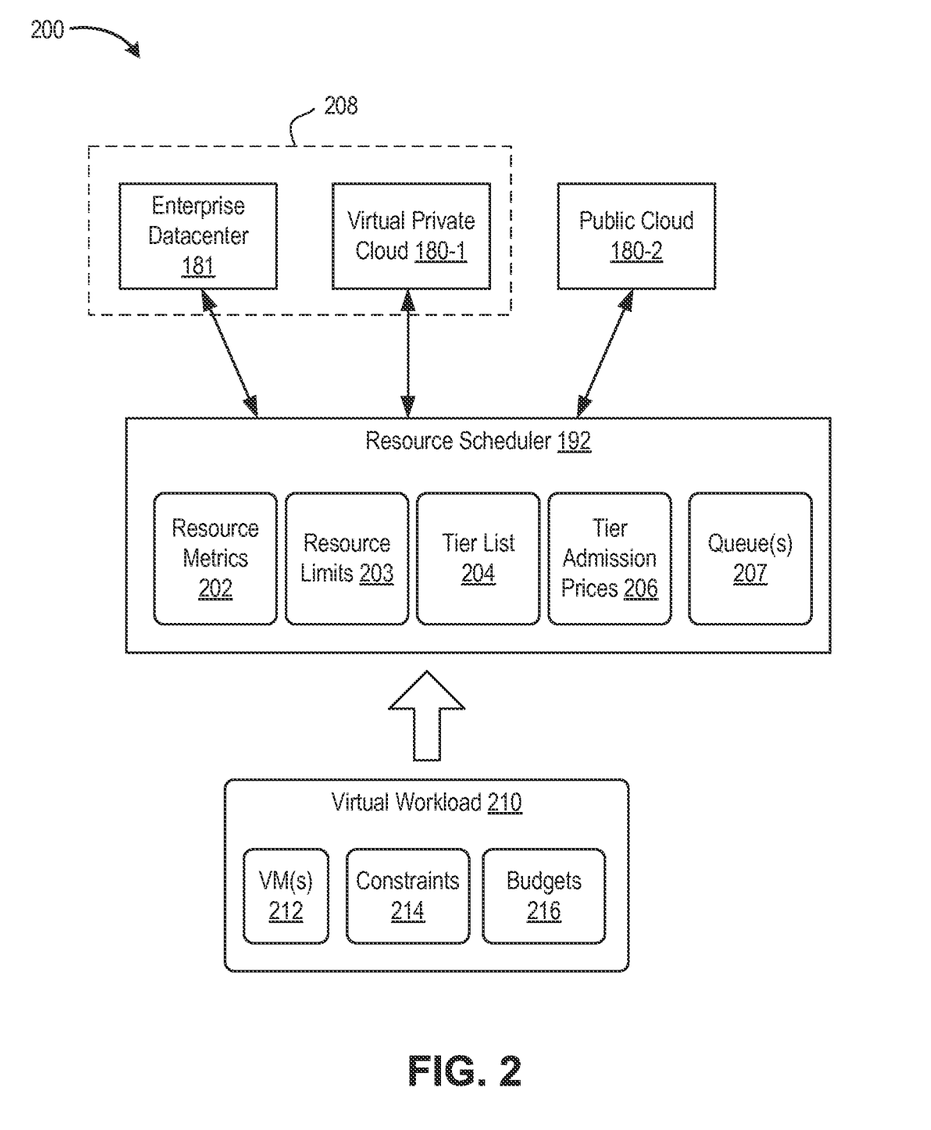
FIG. 2 is a block diagram depicting a computing environment according to an embodiment.

FIG. 2 is a block diagram depicting a computing environment 200 according to an embodiment. Computing environment 200 includes enterprise datacenter 181, a virtual private cloud datacenter ("virtual private cloud 180-1"), a public cloud datacenter ("public cloud 180-2"), and resource scheduler 192. Virtual private cloud 180-1 and public cloud 180-1 comprise instances of a virtual datacenter 180 in cloud computing system 150. Enterprise datacenter 181 comprises hosts 104 and associated servers, storage, systems, etc. in virtualized computing system 102. Resource scheduler 192 is configured for communication with enterprise datacenter 181, virtual private cloud 180-1, and public cloud 180-2. Resource scheduler 192 receives requests to place virtual workloads, such as virtual workload 210. Requests to place a virtual workload can be generated by an administrator or generated automatically by a component in hybrid cloud computing system 100. For example, a request to place a virtual workload can be automatically generated by virtualized computing system 102 (e.g., by virtualization manager 130).

Virtual workload 210 includes one or more VMs 212. In an embodiment, each VM 212 is specified in terms of a source template, a configuration (VM configuration), and a network name. The source template can be a virtual machine template, as described above. A VM configuration specifies the number of virtual CPUs, the memory size, the disk size, and the like for a VM. The network name is an identifier of one or more networks to which the VM is to be connected. VMs 212 can be specified using other types of information. The information specifying VMs 212 gives rise to constraints 214. Constraints 214 can include soft constraints, hard constraints, or a combination thereof. Soft constraints are constraints that can be relaxed as needed. Hard constraints are constraints that cannot be relaxed. For example, VMs can be specified to execute together on the same host. In case of a hard constraint, any placement that does not keep this set of VMs on the same host is not acceptable. In case of a soft constraint, then a placement that keeps all VMs on the same host is preferable, but if no such placement exists, then one or more of the VMs can be placement on a different host. Additional constraints can be specified, as described below.

Resource scheduler 192 is configured to communicate with enterprise data center 181, virtual private cloud 180-1, and public cloud 180-2 to obtain statistics to generate resource metrics 202. Resource scheduler 192 can communicate with the datacenters using an API, such as a REST API, to obtain the statistics. The statistics can include resource usage information. As an example, the statistics collected by resource scheduler 192 include, but are not limited to, processor or CPU statistics, memory statistics, storage statistics, and network statistics. In an embodiment, resource metrics 202 can include utilization and over-commitment metrics for each of CPU, memory, and storage space (e.g., for a total of six resource categories). Utilization can be computed as usage over capacity. Over-commitment can be computed as the sum of configured size over capacity. Over-commitment greater than one indicates a risk of performance problems related to resource contention. Resource scheduler 192 can include a limit for each of the six resource metrics that the resource scheduler 192 will not violate during placement of virtual workload 210 ("resource limits 203"). Resource scheduler 192 can also predict the impact of placing virtual workload 210 when determining resource metrics 202. The above-described six resource metrics are examples of the type of metrics resource scheduler 192 can determine based on the collected statistics. In general, resource scheduler 192 can determine a plurality of resource metrics based on the statistics collected from the datacenters, where each resource metric measures utilization and/or over-commitment of a particular resource.

Resource scheduler 192 also includes a tier list 204. In an embodiment, tier list 204 can specify tiers of datacenters based on cost. For example, tier list 204 can specify a Tier 0, having a lowest cost, to include enterprise datacenter 181; a Tier 1, having a medium cost, to include virtual private cloud 180-1; and a Tier 3, having a highest cost, to include public cloud 180-2. Tier list 204 can define more or less tiers, and the individual tiers can have different types of datacenters assigned thereto. In an embodiment, tier list 204 can also specify named tiers. A named tier can be a logical grouping of datacenters. For example, tier list 204 can include a named tier 208 having enterprise datacenter 181 and virtual private cloud 180-1. Tier list 204 can include one or more named tiers having different logical divisions of the datacenters. In an embodiment, one or more permissible tiers can be specified as part of constraints 214 per VM. For example, a given VM can be confined to placement among one or more specified named tiers, such as named tier 208. Another VM can be confined to placement among Tier 0 and Tier 1 as defined in the example above.

In an embodiment, resource scheduler 192 finds the lowest cost target datacenter for each VM that satisfies constraints 214 with the best resource availability based on resource metrics 202. For candidate datacenters at a given cost level, resource scheduler 192 first examines constraints 214. Any datacenters for which the placement of a VM would exceed any of resource limits 203 are eliminated. In an embodiment, resource scheduler 192 can also consider template availability, with datacenters not having access to the needed templates being eliminated. In an embodiment, resource scheduler 192 can also consider tier constraints defined for a given VM.

Once a candidate set of datacenters is determined, resource scheduler 192 scores each candidate datacenter in the set. In an embodiment, the score is inversely related to the availability of resource metrics 202. A high score indicates that resources are in contention, and a low score indicates otherwise. In an embodiment, each score represents the use of a set of resources relative to their limits, giving the highest weighting to the resource with the highest use relative to its limit. Resource scheduler 192 selects the candidate datacenter having the best score as a target datacenter for placement of a given VM. In an embodiment, resource scheduler 192 can compare the scores against a threshold score and eliminate any candidate datacenters that do not satisfy the threshold score. Resource scheduler 192 can then select among viable datacenters having a score that satisfies a threshold score. In an embodiment, a threshold score can be specified as part of constraints 214 per VM.

In an embodiment, resource scheduler 192 includes tier admission prices 206 to further refine the candidate set of datacenters. Each tier specified in tier list 204 can include an admission price. The value of any admission price can be fixed or can vary over time. For example, an admission price can vary based on time of day (e.g., prime-time versus off-prime time). In another example, an admission price can vary based on resource usage (e.g., congestion). Higher resource usage of datacenters in a tier results in higher admission price and vice versa. The instantaneous value of an admission price can be specified in arbitrary units. In an example, the Tiers 0-2 defined above can have admission prices for both prime-time and off-prime time. In prime-time, Tier 0 can have 100 units admission, Tier 1 can have 500 units admission, and Tier 2 can have 1000 units admission. In off-prime time, Tier 0 can have 0 units admission, Tier 1 can have 100 units admission, and Tier 2 can have 600 units admission. The admission values are exemplary and any other values or other admission price schemes can be employed.

In association with tier admission prices 206, virtual workload 210 includes budgets 216. Each of VMs 112 can include a budget. Each of budgets 216 specifies a limit on an admission price to pay for placement of a VM. The budget can be specified in terms of a specific price (e.g., 500 units), or in terms of category having a specific price. For example, budgets 216 can include a BAT job budget of 1000 units, a CAT job budget of 500 units, an SVS job budget of 100 units, and a CVR job budget of 0 units. With respect to the example admission price scheme described above, a VM having the BAT job budget can be placed in any of Tiers 0 through 2 in either prime-time or off-prime time; a VM having the CAT job budget can be placed in any tier except for Tier 2; a VM having the SVS job budget can be placed only the Tier 0 (enterprise datacenter) during prime-time, or in either Tier 0 or Tier 1 in off-prime time; and a VM having the CVR job budget can be placed only in Tier 0 during off-prime time. The budget categories/values are exemplary and any other values or categories can be employed.

During placement, resource scheduler 192 can use both constraints 214 and budgets 216 when determining a candidate set of datacenters for each VM. Datacenters that do not meet constraints 214, or that have admission prices that exceed budgets 216, are removed from consideration for a given VM. In this manner, resource scheduler 192 generates a candidate set of datacenters for each of VMs 212 in virtual workload 210. Resource scheduler 192 can then score the candidate set of datacenters based on resource metrics 202 and resource limits 203. Resource scheduler 192 can then execute deployment of VMs 212 in virtual workload 210 to target datacenter(s). If there is no target datacenter for a given VM 212, resource scheduler 192 can fail placement and output an indication of the failure. Alternatively, resource scheduler 192 can relax constraints and/or budgets, and/or queue VM placement as described below.

In an embodiment, before failing placement, resource scheduler 192 can relax one or more of constraints 214 in order to place a given VM. For example, resource scheduler 192 can relax soft constraints for a given VM there are no viable target datacenters in the candidate set of datacenters. In an embodiment, resource scheduler 192 can relax a budget for a given VM before failing placement. In an embodiment, resource scheduler 192 can perform a combination of constraint relaxation and budget relaxation. After relaxing constraints 214 and/or budgets 216, resource scheduler 192 determines the candidate set of datacenters based on the relaxed constraints 214 and/or budgets 216. By relaxing constraints 214 and/or budgets 216, resource scheduler 192 can enlarge the candidate set of datacenters, increasing the probability of identifying a target datacenter for placing the VM.

In an embodiment, before failing placement, resource scheduler 192 can queue placement of a VM in a queue. Resource scheduler 192 can establish one or more queues 207 for this purpose. Resource scheduler 192 can keep VMs in queues 207 until a target datacenter can be found. Resource scheduler 192 can take various actions depending on the time a particular VM placement has spent in a queue. For example, resource scheduler 192 can relax constraints 214 and/or budgets 216 based on time spent in a queue. In addition to time spent in a queue, resource scheduler 192 can take into account other factors, such as a priority assigned to a given VM. For VMs having a higher priority, resource scheduler 192 can execute constraint and/or budget relaxation sooner than for VMs having a lower priority. In another embodiment, resource scheduler 192 can maintain a VM placement in a queue until such time as a target datacenter can be identified. For example, after a period of time, admission prices can change (e.g., to off-prime values from prime values), which would enlarge the candidate set of datacenters, potentially resulting in a viable target datacenter for a given VM placement in a queue. In an embodiment, resource scheduler 192 can fail VM placement after a threshold time within a queue.

Figure 3:
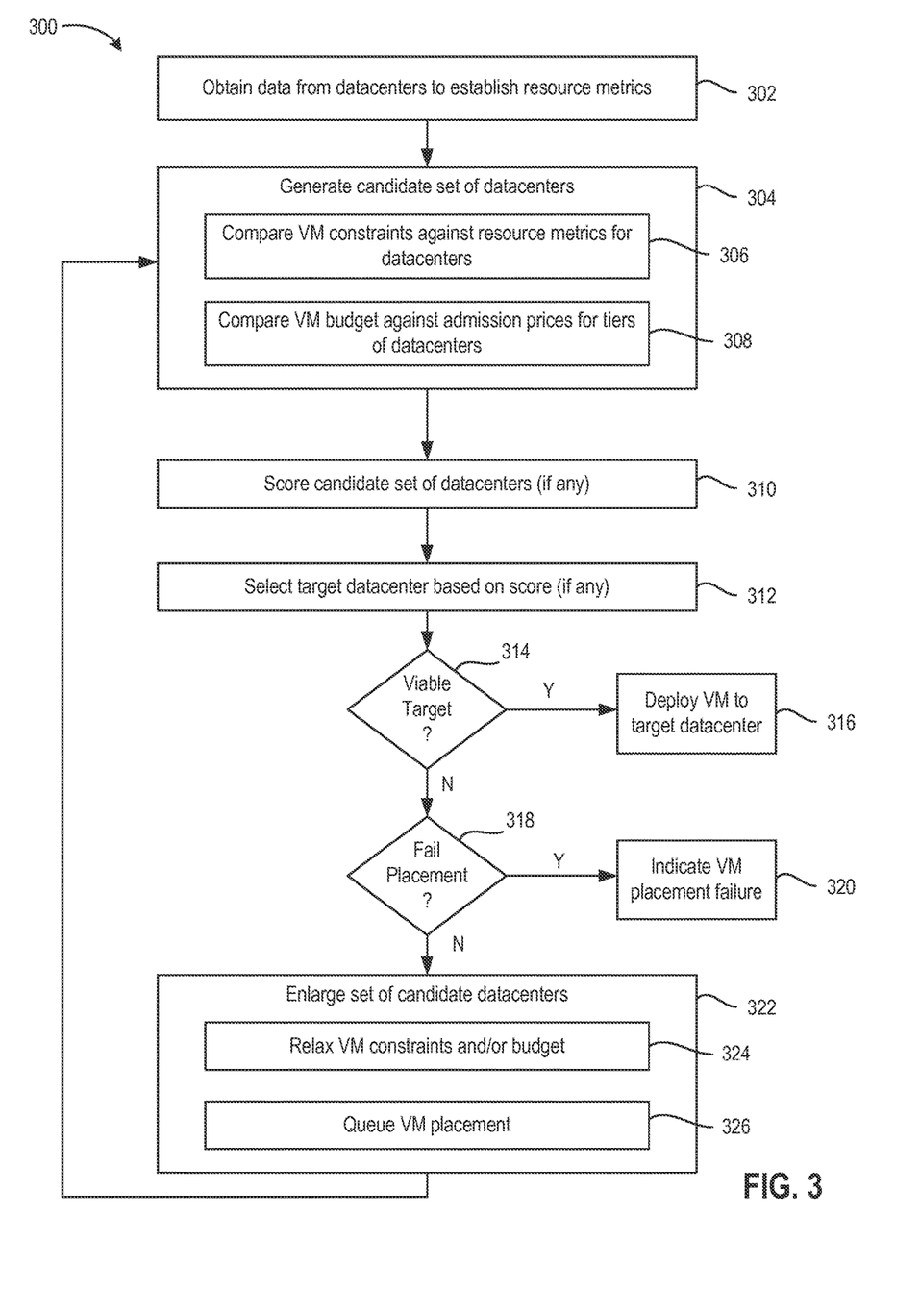
FIG. 3 is a flow diagram depicting a method of placing a virtual machine among a plurality of datacenters according to an embodiment.

FIG. 3 is a flow diagram depicting a method 300 of placing a virtual machine among a plurality of datacenters according to an embodiment. Method 300 can be performed by resource scheduler 192 described above. Method 300 begins at step 302, where resource scheduler 192 obtains data from the datacenters to establish resource metrics 202. At step 304, resource scheduler 192 generates a candidate set of data centers. Step 304 can include a step 306, where resource scheduler 192 compares VM constraints (constraints 214) against resource metrics 202. Step 304 can include a step 308, where resource scheduler 192 compares a VM budget (budgets 216) against admission prices (tier admission prices 206) for tiers (tier list 204) of the datacenters.

At step 310, resource scheduler 192 scores the set of candidate datacenters. In some cases, the set of candidate datacenters can be empty (e.g., no datacenters satisfy the VM constraints or budget). At step 312, resource scheduler 192 selects a target datacenter based on score. In some cases, resource scheduler 192 may not be able to select a target datacenter. For example, the candidate set of datacenters can be empty, or the candidate set of datacenters may not contain a datacenter with a score that satisfies a threshold score.

At step 314, resource scheduler 192 determines whether there is a viable target datacenter for placement of the VM. If so, method 300 proceeds to step 316, where resource scheduler 192 deploys the VM to the target datacenter. Deployment of a VM to a target datacenter can include installing the VM to a host and executing the VM in the target datacenter. If there is no viable target datacenter at step 314, method 300 proceeds instead to step 318. Resource scheduler 192 also updates the resource metrics to represent the impact of the placement on the target datacenter. This avoids a "thundering herd" problem, where all placement requests between periodic metric collection times would otherwise tend to pile onto the targets that were least used at the time of the last metric collection.

At step 318, resource scheduler 192 determines whether to fail placement of the VM. If placement should be failed, method 300 proceeds to step 320, where resource scheduler 192 indicates VM placement failure. Otherwise, method 300 proceeds to step 322.

At step 322, resource scheduler 192 enlarges the set of candidate datacenters. Resource scheduler 192 can accomplish such a task by performing one or both of steps 324 and step 326. At step 324, resource scheduler 192 relaxes VM constraint(s) and/or the VM budget. At step 326, resource scheduler 192 queues the VM placement. Method 300 returns to step 304 and repeats until either the VM is deployed or a failure is indicated.

Figure 4:
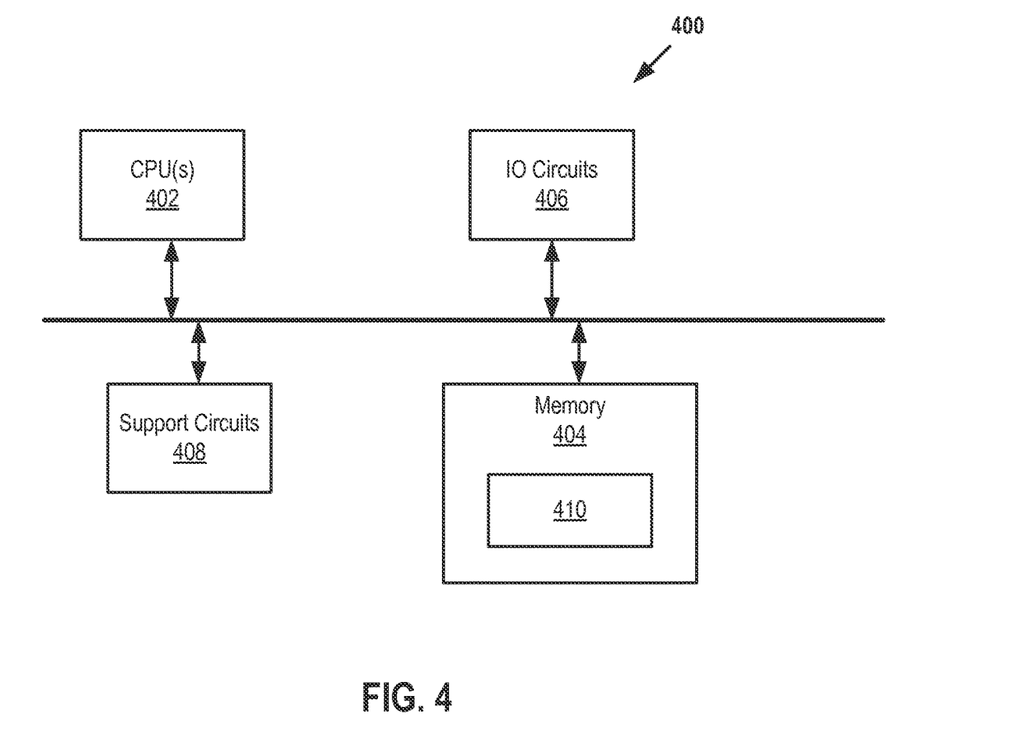
FIG. 4 is a block diagram depicting an example of a computer system in which one or more embodiments of the present disclosure may be utilized.

FIG. 4 is a block diagram depicting an example of a computer system 400 in which one or more embodiments of the present disclosure may be utilized. Computer system 400 can be used as a host to implement resource scheduler 192. Computer system 400 includes one or more central processing units (CPUs) 402, memory 404, input/output (IO) circuits 406, and various support circuits 408. Each of CPUs 402 can include any microprocessor known in the art and can execute instructions stored on computer readable storage, such as memory 404. Memory 404 can include various volatile and/or non-volatile memory devices, such as random access memory (RAM), read only memory (ROM), and the like. Instructions and data 410 for performing the various methods and techniques described above can be stored in memory 404 for execution by CPUs 402. That is, memory 404 can store instructions executable by CPUs 402 to perform method 300 and implement resource scheduler 192. Support circuits 408 include various circuits used to support operation of a computer system as known in the art.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtual computing instance" as used herein is meant to encompass both VMs and OS-less containers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method of placing a virtual computing instance among a plurality of datacenters, comprising:

comparing constraints specified for the virtual computing instance against resource metrics obtained from the plurality of datacenters, and a budget specified for the virtual computing instance against admission prices for a plurality of tiers of the plurality of datacenters, to generate a candidate set of datacenters, wherein the tiers of the datacenters are assigned with different types of datacenters as specified in a tier list;

scoring the candidate set of datacenters;

queuing placement of the virtual computing instance in a queue;

relaxing at least one of the constraints specified for the virtual computing instance based on time spent in the queue and a priority assigned to the virtual computing instance; and deploying the virtual computing instance to a target datacenter selected from the candidate set of datacenters that satisfies a threshold score.

2. The method of claim 1, wherein at least one of the plurality of tiers is associated with a cost to deploy the virtual computing instance.

3. The method of claim 1, wherein at least one of the plurality of tiers is associated with a logical group of the plurality of datacenters.

4. The method of claim 1, further comprising updating the admission prices for the plurality of tiers over time.

5. The method of claim 4, further comprising updating the admission prices for the plurality of tiers according to resource usage among the plurality of datacenters.

6. The method of claim 1,
wherein queuing placement of the virtual computing instance comprises queuing placement of the virtual computing instance at a first time;
wherein the step of deploying the virtual computing instance occurs at a second time.

7. The method of claim 1, wherein the step of deploying the virtual computing instance comprises:
executing the virtual computing instance on at least one host of the target datacenter.

8. A computing system configured to communicate with a plurality of datacenters, comprising:
a memory configured to store code; and
a processor configured to execute the code to implement a resource scheduler, the resource configured to:
compare constraints specified for a virtual computing instance against resource metrics obtained from the plurality of datacenters, and a budget specified for the virtual computing instance against admission prices for a plurality of tiers of the plurality of datacenters, to generate a candidate set of datacenters, wherein the tiers of the datacenters are assigned with different types of datacenters as specified in a tier list;
score the candidate set of datacenters;
queue placement of the virtual computing instance in a queue;
relax at least one of the constraints specified for the virtual computing instance based on time spent in the queue and a priority assigned to the virtual computing instance; and
deploy the virtual computing instance to a target datacenter selected from the candidate set of datacenters that satisfies a threshold score.

9. The computing system of claim 8, wherein at least one of the plurality of tiers is associated with a cost to deploy the virtual computing instance.

10. The computing system of claim 8, wherein at least one of the plurality of tiers is associated with a logical group of the plurality of datacenters.

11. The computing system of claim 8, further comprising updating the admission prices for the plurality of tiers over time.

12. The computing system of claim 11, further comprising updating the admission prices for the plurality of tiers according to resource usage among the plurality of datacenters.

13. The computing system of claim 8, wherein the resource scheduler is further configured to:
queue placement of the virtual computing instance at a first time;
wherein the resource scheduler is configured to deploy the virtual computing instance occurs at a second time.

14. A non-transitory computer readable medium comprising instructions, which when executed in a computer system, causes the computer system to carry out a method of placing a virtual computing instance among a plurality of datacenters, comprising:
comparing constraints specified for the virtual computing instance against resource metrics obtained from the plurality of datacenters, and a budget specified for the virtual computing instance against admission prices for a plurality of tiers of the plurality of datacenters, to generate a candidate set of datacenters, wherein the tiers of the datacenters are assigned with different types of datacenters as specified in a tier list;
scoring the candidate set of datacenters;
queuing placement of the virtual computing instance in a queue;
relaxing at least one of the constraints specified for the virtual computing instance based on time spent in the queue and a priority assigned to the virtual computing instance; and
deploying the virtual computing instance to a target datacenter selected from the candidate set of datacenters that satisfies a threshold score.

15. The non-transitory computer readable medium of claim 14, wherein at least one of the plurality of tiers is associated with a cost to deploy the virtual computing instance.

16. The non-transitory computer readable medium of claim 14,
wherein queuing placement of the virtual computing instance comprises queuing placement of the virtual computing instance at a first time;
wherein the step of deploying the virtual computing instance occurs at a second time.

17. The non-transitory computer readable medium of claim 14, wherein the step of deploying the virtual computing instance comprises:
executing the virtual computing instance on at least one host of the target datacenter.

* * * * *